United States Patent [19]

Norman et al.

[11] Patent Number: 5,551,516
[45] Date of Patent: Sep. 3, 1996

[54] HYDRAULIC FRACTURING PROCESS AND COMPOSITIONS

[75] Inventors: William D. Norman, Lafayette, La.; Raymond J. Jasinski, Tulsa; Erik B. Nelson, Broken Arrow, both of Okla.

[73] Assignee: Dowell, a division of Schlumberger Technology Corporation

[21] Appl. No.: 389,857

[22] Filed: Feb. 17, 1995

[51] Int. Cl.$^6$ .................................................. E21B 43/269
[52] U.S. Cl. ........................ 166/308; 507/239; 507/244; 507/922
[58] Field of Search ........................ 166/308; 507/239, 507/240, 244, 922

[56] References Cited

U.S. PATENT DOCUMENTS

| | | | |
|---|---|---|---|
| 3,760,881 | 9/1973 | Kiel | 166/308 |
| 4,061,580 | 12/1977 | Jahnke | 507/922 X |
| 4,615,825 | 10/1986 | Teot et al. | 507/239 X |
| 4,725,372 | 2/1988 | Teot et al. | 507/922 X |
| 5,258,137 | 11/1993 | Bonekamp et al. | 507/240 X |
| 5,310,002 | 5/1994 | Blauch et al. | 166/308 X |

*Primary Examiner*—George A. Suchfield
*Attorney, Agent, or Firm*—John E. Vick, Jr.

[57] ABSTRACT

Viscoelastic surfactant based aqueous fluid systems are described that are useful in fracturing subterranean formations penetrated by a wellbore. The preferred thickening agents are quaternary ammonium halide salts derived from certain waxes, fats and oils. The thickening agent is used in conjunction with an inorganic water soluble salt such as ammonium chloride or potassium chloride, and an organic stabilizing additive selected from the group of organic salts such as sodium salicylate. The resulting fluids are stable to a fluid temperature of about 225° F.

6 Claims, No Drawings

HYDRAULIC FRACTURING PROCESS AND COMPOSITIONS

This invention relates to the art of fracturing a subterranean formation penetrated by a wellbore. The invention pertains specifically to the use of aqueous viscoelastic surfactant based fluids as hydraulic fracturing fluids, particularly in formations having high temperature and high permeability.

BACKGROUND OF THE INVENTION

Hydraulic fracturing is a term that has been applied to a variety of methods used to stimulate the production of fluids such as oil, natural gas, brines, etc., from subterranean formations. In hydraulic fracturing, a fracturing fluid is injected through a wellbore and against the face of the formation at a pressure and flow rate at least sufficient to overcome the overburden pressure and to initiate and/or extend a fracture(s) into the formation. The fracturing fluid usually carries a proppant such as 20–40 mesh sand, bauxite, glass beads, etc., suspended in the fracturing fluid and transported into a fracture. The proppant then keeps the formation from closing back down upon itself when the pressure is released. The proppant filled fractures provide permeable channels through which the formation fluids can flow to the wellbore and thereafter be withdrawn.

Hydraulic fracturing has been used for many years as a stimulation technique and extensive work has been done to solve problems present at each stage of the process. For example, a fracturing fluid is often exposed to high temperatures and/or high pump rates and shear which can cause the fluids to degrade and to prematurely "drop" the proppant before the fracturing operation is completed. Considerable effort has, therefore, been spent trying to design fluids that will satisfactorily meet these rigorous conditions.

High permeability formations such as those having permeabilities in excess of 50 millidarcy and particularly in excess of 200 millidarcy, present special challenges, especially when the reservoir temperature is above 130° F. In these situations, the amount of fluid lost to the formation can be very high, resulting in increased damage and decreased fracture length. Further, the difference in permeability between the formation and the fracture is less than that realized in less permeable formations. Improved fracture cleanup is therefore necessary in order to maximize well productivity.

A wide variety of fluids has been developed, but most of the fracturing fluids used today are aqueous based liquids which have been either gelled or foamed. These fluids have typically been engineered for use in low permeability formations and are generally not well suited for use in higher permeability formations.

Aqueous gels are usually prepared by blending a polymeric gelling agent with an aqueous medium. Most frequently, the polymeric gelling agent of choice is a solvatable polysaccharide. These solvatable polysaccharides form a known class of compounds which include a variety of natural gums as well as certain cellulosic derivatives which have been rendered hydratable by virtue of hydrophilic substituents chemically attached to the cellulose backbone. The solvatable polysaccharides therefore include galactomannan gums, glycomannan gums, cellulose derivatives, and the like.

The solvatable polysaccharides have a remarkable capacity to thicken aqueous liquids, small amounts of these materials being sufficient to increase the viscosity of such aqueous liquids from 10 to 100 times or more. In some instances, the aqueous liquid thickened with polymers alone has sufficient viscosity to suspend the proppant during the course of the fracturing process and represents a satisfactory fracturing fluid. In other instances, principally in higher temperature applications, however, it is necessary to crosslink the polysaccharide in order to form a gel having sufficient strength and viscosity to retain the proppant in suspension throughout the pumping operation and placement in the subterranean formation. A variety of crosslinkers has been developed to achieve this result within different pH ranges.

The borate ion has been used extensively as a crosslinking agent for hydrated guar gums and other galactomannans to form aqueous gels used in fracturing and other areas. For example, U.S. Pat. No. 3,059,909 describes a crosslinked system which has been used extensively in the oil and gas industry as a fracturing fluid. A fracturing process which comprised crosslinking guar-containing compositions on-the-fly with a borate crosslinker is described in U.S. Pat No. 3,974,077. The borate crosslinked systems require a basic pH (e.g., 8.5 to 10) for crosslinking to occur. Borate crosslinked guar fluids, particularly fluids using less than 30 pounds guar per 1000 gallons of fluid have been used successfully in higher permeability formations up to a temperature of about 275° F. With increased guar loadings, such fluids can be effective up to a temperature of about 350° F.

Other crosslinking agents have been developed using certain transition metals. U.S. Pat No. 3,202,556, describes aqueous solutions of galactomannan gums which are crosslinked at a pH of from 5 to 13 with antimony or bismuth crosslinkers. U.S. Pat. No. 3,301,723, describes the use of certain titanium, zirconium, and other transition metals as crosslinking agents for galactomannans at a pH also in the range of from about 6 to about 13. In these patents, a basic pH is used to prepare crosslinked materials having utility in the explosives industry.

U.S. Pat. No. 3,888,312 describes the use of titanium crosslinkers with solvatable polysaccharides in fracturing fluids. The use of such crosslinked gels may act to overcome the high friction loss experienced during the pumping of many high-viscosity fracturing fluids previously known. U.S. Pat No. 3,301,723, also points out that crosslinked gels formed using titanium, chromium, iron and zirconium crosslinkers have a high surface tension i.e., stickiness and tackiness are absent, ready workability and other desirable physical characteristics.

A disadvantage associated with the above systems is related to the use of guar or guar derivatives as thickening agents. Such polymers are derived from natural sources, and usually contain insoluble materials that tend to remain in the formation or fracture after the fracturing treatment, and reduce the permeability of the formation or the fracture. Damage to the formation can be particularly important when the formation permeability exceeds about 100 mD. In such cases, whole fluid can penetrate the rock and fill the pore spaces. To minimize this problem, fracturing fluids have been developed that leave little or no residue.

Typical low-residue fluid systems comprise linear solutions of hydroxyethylcellulose (HEC). Like guar polymers, HEC is derived from natural sources; however, highly refined material is commercially available that is virtually free of insolubles. A potential problem with HEC is the formation of large incompletely hydrated lumps, also referred to as "fish eyes", and/or microgels during mixing. These insoluble materials result from poor dispersion of the HEC before the particles begin to hydrate, and the impact on formation and fracture permeability is as deleterious as the insoluble residue from guar polymers. In an attempt to avoid this problem, HEC fluids must commonly be sheared and filtered at the wellsite prior to pumping, thereby adding complexity and cost to its use, although this procedure is not 100% successful in addressing the problem.

The use of HEC-based fluids in fracturing applications is limited to use at formation temperatures of about 130° to about 150° F. As the temperature increases, the viscosity of these fluids decreases to nearly that of water, even for solutions having HEC loadings of 80 to 120 pounds per 1000 gallons of fluid. Above about 150° F., the high leakoff rate inhibits or even prohibits the extension of the fracture. this is especially true in high permeability formations. As a result of the high HEC polymer loadings, large amounts of polymer are deposited in the formation which impair well productivity.

A different class of thickeners is described in U.S. Pat. No. 4,432,881, and identified as a superior fracturing fluid in U.S. Pat. No. 4,541,935. The thickener composition comprises a water soluble or water dispersible interpolymer having pendant hydrophobic groups chemically bonded thereto. When mixed with a water soluble or water dispersible nonionic surfactant, and a soluble electrolyte, a viscosified fluid stable to high temperature and/or shear is obtained. No problems with fish eyes or microgels are encountered, and conventional field mixing equipment can be used. The preferred interpolymers are vinyl addition polymers in which two or more vinyl monomers with ethylenic unsaturation are reacted together under polymerization conditions. Of these, polymers containing at least one of the water soluble monomers represented by Formula 1 or Formula 2 are preferred.

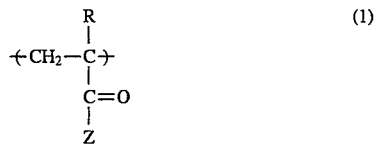

(1)

R is hydrogen or methyl and Z is —NH$_2$, —OH, —OR' where R' is a C$_1$–C$_4$ alkyl group, —NH—R"—SO$_3$M wherein R" is an alkylene group of from 1 to 24 carbon atoms (preferably C$_1$ to C$_4$ alkylene) and M is hydrogen or an ammonium or alkali metal ion.

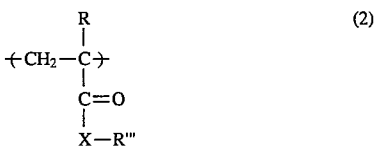

(2)

R is hydrogen or methyl, X is —O— or —NH—, and R is a hydrophobic group. R'" is preferably an aliphatic hydrophobic group such as an alkyl or alkenyl group of from 6 to about 24 carbon atoms or an inertly substituted such group, etc., and is most preferably an alkyl group of from about 8 to about 24 carbon atoms.

The interpolymers are usually solid polymers having a number average molecular weight of about one million or more.

The nonionic surfactant has a hydrophilic-lipophilic balance (HLB) of from about 10 to about 14. Such nonionic surfactants constitute a known class of compounds having many members. The preferred materials are ethoxylated alkanols having from about 8 to about 24 carbon atoms in the alkanol moiety. The preferred water soluble electrolytes are the sodium, potassium and ammonium halides.

Viscoelastic surfactants are employed as viscosifiers in the context of gravel packing fluids. Such systems contain virtually no insoluble residue. Gravsholt in "Viscoelasticity in Highly Dilute Aqueous Solutions of Pure Cationic Detergents," *J. Colloid & Interface Sci.* (57)3(1976), 575–77 indicates that certain quaternary ammonium salts impart viscoelastic properties to aqueous solutions. Gravsholt showed that cetyl trimethyl ammonium bromide would not impart viscoelastic properties to water but that cetyl trimethyl ammonium salicylate and certain other aromatic containing quaternary amines would. In U.S. Pat. No. 3,292,698, a mixture of cyclohexyl ammonium chloride and undecane-3-sodium sulfate was taught to induce viscoelastic properties to a formation flooding liquid containing less than about 3.5 percent by weight of sodium chloride. Higher levels of sodium chloride were said to destroy the viscoelastic properties of the fluid. UK Pat. No. 1,443,244, discloses a specific ethoxylated or propoxylated tertiary amine employed to thicken and aqueous solution of a strong mineral acid. U.S. Pat. No. 3,917,536 teaches that certain primary amines may be employed in subterranean formation acidizing solutions to retard the reaction of the acid on the formation. The amine may be more readily dispersed into the acid solution with the use of a dispersing agent such as a quaternary amine.

In particular Canadian Pat. No. 1,185,779, discloses a high electrolyte-containing aqueous wellbore service fluid which has improved viscosity characteristics over a wide range of wellbore conditions, including improved ease of preparation at the wellside and better shear stability and consistent viscosity over a wide temperature range. These improved aqueous wellbore service fluids are acknowledged as being useful in well known wellbore services such as perforation, clean-up, long term shut-in, drilling, placement of gravel packs and the like.

SUMMARY OF THE INVENTION

The present invention provides a fracturing fluid for use in high temperature, high permeability formations which has a low leakoff rate, adequate viscosity to effect fracture extension and proppant transport and little or no residue remaining upon completion of the fracturing operation.

In accordance with the invention, a process for fracturing a subterranean formation penetrated by a wellbore comprises providing an hydraulic fracturing fluid having a composition as set forth below and injecting the hydraulic fracturing fluid through the wellbore and against the formation at a flow rate and pressure at least sufficient to initiate and/or extend a fracture into the formation. The hydraulic fracturing fluid comprises:

A. an aqueous base fluid;

B. an effective amount of an inorganic water soluble salt to stabilize a subterranean formation by inhibiting hydration;

C. an effective amount of at least one thickener in the fluid, the thickener being at least one member selected from the group consisting of (i) an amine corresponding to the formula

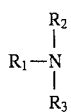

wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic;

(ii) salts of the amine corresponding to the formula

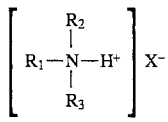

wherein $R_1$, $R_2$ and $R_3$ are the same as defined hereinbefore and $X^{31}$ is an inorganic anion, and;

(iii) a quaternary ammonium salt of the amine corresponding to the formula

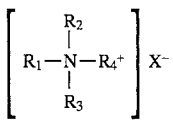

wherein $R_1$, $R_2$, $R_3$ and $X^-$ are the same as defined hereinbefore and $R_4$ independently constitutes a group which has previously been set forth for $R_3$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine;

D. an effective amount of a stabilizing organic additive selected from the group consisting of an organic salt, a $C_4$ to $C_{12}$ aliphatic alcohol and mixtures thereof.

Further in accordance with the invention, the process of fracturing as set forth above comprises providing an hydraulic fracturing fluid as set forth above wherein the selected thickener is selected from a group consisting of: erucyl trimethyl ammonium chloride; N-methyl-N,N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; bis(hydroxyethyl) soya amine; N-methyl, N-hydroxyethyl tallow amine; bis(hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino, N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate and combinations thereof.

Still further in accordance with the invention, the process of fracturing as set forth above for use in high temperature formations comprises providing an hydraulic fracturing fluid as set forth above wherein the selected thickener is erucyl methyl bis(2-hydroxyethyl) ammonium chloride.

It is therefore an object of this invention to provide a fracturing fluid for use in high temperature, high permeability formations which has low leakoff into the formation during the fracturing process It is another object of this invention to provide a fracturing fluid with little or no residue following completion of the fracturing treatment.

It is yet another object of this invention to provide a fracturing fluid which avoids the use of damaging polymer thickeners, particularly in high permeability formations.

DETAILED DESCRIPTION OF THE INVENTION

These and other objects of the invention are accomplished through the manner and form of the present invention to be described hereinafter and illustrated in a number of examples. It will be understood that the description and examples are presented solely for the purpose of illustrating the preferred embodiments of the invention and should not in any way be construed as a limitation on the scope and applicability of the invention.

The present invention comprises an aqueous viscoelastic surfactant based fracturing fluid. The fluid comprises water, an inorganic salt stabilizer, a surfactant/thickener and an organic salt or alcohol. The fracturing fluid may optionally contain a gas such as air, nitrogen or carbon dioxide to provide an energized fluid or a foam. A small group of surfactants having unique viscoelastic properties make them of high interest for use in fracturing applications but which find particular utility in forming fracturing fluids for fracturing treatment of high permeability subterranean formations. In contrast to such fluids as HEC, which are typically used in such formations and which have a high leakoff rate which is highly sensitive to increasing pressure since they do not build filter cake, the surfactants used in the present invention create fluids which have a low leakoff rate which is also substantially insensitive to pressure. As a result, at high pressures such as are used during a fracturing operation, little fluid is lost to the formation. This reduces the total volume of fluid needed to provide the desired fracture with an associated cost savings. Further, since leakoff is minimized, longer fracture length extension is practicable. Finally, at low pressures, these low molecular weight surfactant systems flow out of the formation more easily with low residue and superior cleanup resulting in improved well productivity.

The viscosifiers commonly used in the petroleum industry are polymeric structures starting with molecular weights of hundreds of thousands to several million grams per mole. These large, chemically bonded structures are often crosslinked to further increase molecular weight and effective viscosity per gram of polymer added to the fluid. These large molecules are quite stable and can filter out on the sand grains of the formation to reduce conductivity or permeability of the reservoir. This decreases well productivity. As a result, expensive and often corrosive breakers have been designed to destroy the molecular backbone of these polymeric structures. This reduces the molecular weight of the polymer, ideally making it more soluble in the surrounding fluids and easier to remove from the formation, thereby improving reservoir productivity. These breakers are typically oxidizers or enzymes. They are at best only partially effective with typical reservoir cleanup less than 80% complete and more usually much less than 50% complete.

In dramatic contrast, viscoelastic surfactants are relatively small molecules. Each molecule is typically less than 500 grams per mole—less than 0.1% the size of the polymers used. These small molecules will associate under certain conditions to form structures which resemble the polymer molecules but which are not stable structures. The individual molecules of surfactant begin to associate much like the steps of a spiral staircase. These structures are always in an equilibrium state of breaking and reforming. As dynamic structures, these polymer-shaped micelles are readily destroyed by shear, presence of hydrocarbons or increased temperature. All of these features are found in the reservoir. Therefore, the viscoelastic surfactants rapidly return to their original small independent molecule state once they are pumped into the reservoir and are no longer needed to provide viscosity which is needed to transport particles into the formation.

By careful design, the well treatment conditions which allow the polymer-shaped micelles to form under surface conditions, remain stable while they are pumped down the wellbore and through the perforations into a fracture or open perforation cavity but then the micelles break back to the individual components in the reservoir rock. Therefore, no corrosive, expensive breaker is required and cleanup is often superior to that of the polymer systems, typically higher than 80%.

In addition to the viscoelastic surfactant, the aqueous fracturing fluid in accordance with the invention requires a sufficient quantity of at least one water soluble inorganic salt to effect formation stability. Typically, water soluble potassium and ammonium salts, such as potassium chloride and ammonium chloride are employed. Additionally, calcium chloride, calcium bromide and zinc halide salts may also be used. Formation stability and in particular clay stability is achieved at a concentration level of a few percent by weight and as such the density of the fluid is not significantly altered by the presence of the inorganic salt unless fluid density becomes an important consideration, at which point, heavier inorganic salts may be employed.

In accordance with the invention, a sufficient quantity of at least one surfactant/thickener soluble in said aqueous salt solution is employed to effect, in combination with an organic salt and/or alcohol, sufficient viscosity to suspend proppant during placement, wherein the thickener is at least one member selected from the group consisting of:

(a) an amine corresponding to the formula

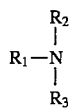

wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic;

(b) salts of the amine corresponding to the formula

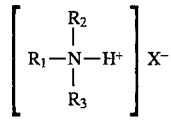

wherein $R_1$, $R_2$ and $R_3$ are the same as defined hereinbefore and $X^-$ is an inorganic anion, and;

(c) a quaternary ammonium salt of the amine corresponding to the formula

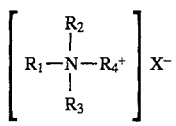

wherein $R_1$, $R_2$, $R_3$ and $X^-$ are the same as defined hereinbefore and $R_4$ independently constitutes a group which has previously been set forth for $R_2$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine;

A sufficient quantity of a water soluble organic salt and/or alcohol is employed to effect, in combination with the thickener, the desired viscoelastic properties. Preferably the organic salt is a water soluble carboxylate salt such as sodium or potassium salicylate or the like. Preferably the alcohol is a cosurfactant, typically a $C_4$ to $C_{12}$ aliphatic alcohol.

One preferred aqueous hydraulic fracturing fluid contains up to a few percent of an inorganic salt such as KCl or NH$_4$Cl and a selected amount of an organic salt such as sodium salicylate. A preferred thickening agent for the above defined hydraulic fracturing fluid is a quaternary ammonium salt, erucyl methyl bis (2-hydroxyethyl) ammonium chloride.

The thickening agent employed in the invention comprises at least one of the thickening agents defined hereinbefore. It has been found that with certain solutions, a mixture of two or more thickeners may be preferred.

In instances where the thickening agent is an amine acid salt or a quaternary ammonium salt, the associated anion should be an inorganic anion. Preferably, $X^-$ is an inorganic anion such as a sulfate, nitrate, perchlorate or halide. A halide (Cl, Br or l) is preferred, Cl and Br being most preferred.

The organic salt constituent of the fracturing fluid is preferably a water soluble compound involving typically a sodium or potassium salt of an organic anion. The anion may be an aromatic organic anion such as a salicylate, naphthalene sulfonate, p- and m-chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6,-tetrachlorophenate, p-methyl phenate, m-chlorophenate, 3,5,6-trichloropicolinate, 4-amino-3,5,6-trichloropicolinate, 2,4,-dichlorophenoxyacetate, toluene sulfonate, $\alpha,\beta$-napthols, p.p'bisphenol A or cocoamidopropyl dimethyl amine oxide. The thickening agent should be chosen such that the anion is compatible with the electrolyte present in the aqueous solution such that undesirable precipitates are not formed. Also the specific anion chosen will depend to some degree on the specific amine structure.

The thickening agent is employed in an amount which in combination with the other ingredients is sufficient to increase the viscosity of the aqueous fluid enough to maintain proppant in suspension during fluid placement. The exact quantity and specific thickener or mixture of thickeners to be employed will vary depending on the concentration of and specific soluble salt(s) employed to make up the solution, the viscosity desired, the temperature of use, the pH of the solution, and other similar factors. The concentration of the surfactant thickener can range from about 0.05 to about 6 percent by weight of the fluid. Simple laboratory procedures can be employed to determine the optimum concentrations for any particular set of parameters. For example, when a non-protonated amine is employed as the thickener, the pH of the aqueous fluid can affect to some degree the effectiveness of particular amines. More acidic solutions are required for some amines to be dissolved therein. It is thought that this is because the amine must become protonated before it will become effectively dissolved in the fluid.

The thickeners are selected from a group of surfactant materials capable of forming rod-shaped micelles as opposed to typical surfactant materials which tend to form spherical micelles or sheet-like structures. Further, in order to be useful in the present invention, the selected surfactant must be able to form the rod-shaped micelles over a broad range of concentrations, such as 1 to 8 percent by weight in the aqueous fluid. The number of surfactant materials which can be successfully used in the invention decreases with increasing temperature. Temperature applicability is primarily a function of the molecular weight of the longest aliphatic carbon chain on the amine functionality but is also sensitive to the formation in which the resultant fluid is to be used.

Alternative thickeners which may be employed either singly or in combination in accordance with the invention include erucyl trimethyl ammonium chloride; N-methyl-N, N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; bis(hydroxyethyl) soya amine; N-methyl, N-hydroxyethyl tallow amine; bis(hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino; N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

To prepare the aqueous hydraulic fracturing fluid in accordance with the present invention, the thickener is added to an aqueous solution in which has been dissolved a quantity of at least one water soluble inorganic salt to provide formation stability and at least one water soluble organic salt to provide selective control of the loss of particle suspension properties. Standard mixing procedures known in the art can be employed since heating of the solution and special agitation conditions are normally not necessary. Of course, if used under conditions of extreme cold such as found in Alaska, normal heating procedures should be employed. It has been found in some instances preferable to dissolve the thickener into a lower molecular weight alcohol prior to mixing it with the aqueous solution. The lower molecular weight alcohol, for instance isopropanol, functions as an aid to solubilize the thickener. Other similar agents may also be employed. Further, a defoaming agent such as a polyglycol may be employed to prevent undesirable foaming during the preparation of the fracturing fluid if a foam is not desirable under the conditions of the treatment. If a foam or gas-energized fluid is desired, any gas such as air, nitrogen, carbon dioxide and the like may be added.

In addition to the water soluble salts and thickening agents described hereinbefore, the aqueous hydraulic fracturing fluid may contain other conventional constituents which perform specific desired functions, e.g., corrosion inhibitors, fluid-loss additives, and the like. The proppant can then be suspended in the fracturing fluid.

The fluids defined herein can be employed in standard fracturing treatments, employing techniques and equipment well known in the art. The following examples illustrate the preparation and properties of aqueous viscoelastic surfactant-based hydraulic fracturing fluids.

EXAMPLE 1

Three 500-ml beakers were filled with 200 ml of three percent (by weight) ammonium chloride solution. Three percent erucyl methyl bis(2-hydroxyethyl) ammonium chloride surfactant was added to the first solution. Four and five percent (by weight) of the surfactant were added to the other two, respectively. The systems were stirred until all of the surfactant dissolved. Rheological measurements were performed at 130°, 150° and 180° F. using a Fann 35 rotational viscometer The solution containing five percent surfactant was tested at 200° and 225° F. with a reciprocating capillary viscometer. The results are given below.

| Fluid | Viscosity (cp) @ 170 sec$^{-1}$ | | |
|---|---|---|---|
| Temperature (°F.) | 3% surfactant | 4% surfactant | 5% surfactant |
| 130 | 105 | 165 | 213 |
| 150 | 96 | 144 | 198 |
| 180 | 72 | 144 | 174 |
| 200 | — | — | 54 |
| 225 | — | — | 17 |

EXAMPLE 2

In a manner similar to Example 1, five percent (by weight) erucyl methyl bis(2-hydroxyethyl) ammonium chloride surfactant was added to 200 ml of four percent (by weight) potassium chloride solution. Rheological measurements were performed in the manner described in Example 1. The results are given below.

| Fluid Temperature (°F.) | Viscosity (cp) @ 170 sec$^{-1}$ 5% surfactant |
| --- | --- |
| 130 | 168 |
| 150 | 162 |
| 180 | 138 |
| 200 | 84 |
| 225 | 45 |

EXAMPLE 3

In a manner similar to Example 1, five percent (by weight) erucyl methyl bis(2-hydroxyethyl) ammonium chloride surfactant and 0.2% (by weight) sodium salicylate stabilizer were added to 200 ml of three percent (by weight) ammonium chloride solution. Rheological measurements were performed in the manner described in Example 1. The results are given below.

| Fluid Temperature (°F.) | Viscosity (cp) @ 170 sec$^{-1}$ 5% surfactant + 0.2% sodium salicylate |
| --- | --- |
| 130 | 132 |
| 150 | 132 |
| 180 | 117 |
| 200 | 101 |
| 225 | 40 |

EXAMPLE 4

In a manner similar to Example 1, five percent (by weight) erucyl methyl bis(2-hydroxyethyl) ammonium chloride surfactant and 0.2% (by weight) sodium salicylate stabilizer were added to 200 ml of four percent (by weight) potassium chloride solution. Rheological measurements were performed in the manner described in Example 1. The results are given below.

| Fluid Temperature (°F.) | Viscosity (cp) @ 170 sec$^{-1}$ 5% surfactant + 0.2% sodium salicylate |
| --- | --- |
| 130 | 174 |
| 150 | 159 |
| 180 | 159 |
| 200 | 90 |
| 225 | 53 |

EXAMPLE 5

The previous examples have illustrated the viscosifying effect of the undiluted surfactant. For proper execution of this invention at the wellsite it is typically necessary to prepare an easily pourable system by diluting the surfactant with a solvent such as isopropyl alcohol. A mixture was prepared with the following weight-percent composition: erucyl methyl bis(2-hydroxyethyl) ammonium chloride (75%); sodium salicylate (3%); isopropyl alcohol (15%); water (7%).

In a manner similar to Example 1, six percent (by volume) of the mixture described above was added to 200 ml of three percent (by weight) ammonium chloride. Rheological measurements were performed at 175°, 200° and 225° F. using a reciprocating capillary viscometer. The results are given below.

| Fluid Temperature (°F.) | Viscosity (cp) @ 170 sec$^{-1}$ 6% (by volume) surfactant mixture |
| --- | --- |
| 175 | 150 |
| 200 | 50 |
| 225 | 20 |

EXAMPLE 6

In a manner similar to Example 5, a mixture was prepared with the following weight-percent composition: N-methyl-N,N-bis(2-hydroxyethyl) rapeseed ammonium chloride (75%); sodium salicylate (3%); isopropyl alcohol (7%); water (15%).

In a manner similar to Example 1, six percent (by volume) of the mixture described above was added to 200 ml of three percent (by weight) ammonium chloride. Rheological measurements were performed at 110°, 120°, 130°, 140° and 150° F. using a Fann 35 rotational viscometer, and 200° F. using a reciprocating capillary viscometer. The results are given below.

| Fluid Temperature (°F.) | Viscosity (cp) @ 170 sec$^{-1}$ 6% (by volume) surfactant mixture |
| --- | --- |
| 110 | 187 |
| 120 | 117 |
| 130 | 43 |
| 140 | 23 |
| 150 | 14 |
| 200 | 5 |

While the invention has been described in the more limited aspects of preferred embodiments thereof, other embodiments have been suggested and still others will occur to those skilled in the upon a reading and understanding of the foregoing specification. It is intended that all such embodiments be included within the scope of this invention as limited only by the appended claims.

Having thus described our invention, we claim:

1. A method of fracturing a subterranean formation comprising the steps of
   (A) providing an aqueous viscoelastic surfactant based hydraulic fracturing fluid comprising:
      (1) an aqueous medium;
      (2) an effective amount of an inorganic water soluble ammonium salt to stabilize a subterranean formation by inhibiting hydration;
      (3) an effective amount of at least one thickener in the fluid, the thickener comprising N-methyl-N, N-bis(2-hydroxyethyl) rapeseed ammonium chloride in an amount ranging from about 0.5 to about 6% by weight of the fluid;
      (4) an effective amount of an organic stabilizing additive selected from the group consisting of an organic salt, a $C_4$ to $C_{12}$ aliphatic alcohol and mixtures thereof, and
   (B) pumping the aqueous viscoelastic surfactant based fluid through a wellbore and into a subterranean formation at a pressure sufficient to fracture the formation.

2. The method of fracturing as set forth in claim 1 wherein the step of providing comprises providing an aqueous viscoelastic surfactant based fluid further including a particulate proppant suspended therein.

3. A method of fracturing a subterranean formation comprising the steps of
(A) providing an aqueous viscoelastic surfactant based hydraulic fracturing fluid including a thickener comprising:
(1) an aqueous medium;
(2) an effective amount of an inorganic water soluble salt to stabilize a subterranean formation by inhibiting hydration;
(3) an effective amount of thickener comprising a mixture of erucyl methyl bis (2-hydroxyethyl) ammonium chloride and a quaternary ammonium salt of the amine corresponding to the formula

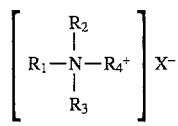

wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic, and $R_4$ independently constitutes a group which has previously been set forth for $R_3$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine; and
(4) an effective amount of an organic stabilizing additive selected from the group consisting of an organic salt, a $C_4$ to $C_{12}$ aliphatic alcohol and mixtures thereof, and
(B) pumping the aqueous viscoelastic surfactant based fluid through a wellbore and into a subterranean formation at a pressure sufficient to fracture the formation.

4. The method of fracturing as set forth in claim 3 wherein the step of providing comprises providing an aqueous viscoelastic surfactant based hydraulic fracturing fluid including a thickener comprising at least 60% by weight erucyl methyl bis (2-hydroxyethyl) ammonium chloride.

5. The method of fracturing as set forth in claim 3 wherein the step of providing comprises providing an aqueous viscoelastic surfactant based hydraulic fracturing fluid including a thickener comprising at least 75% by weight erucyl methyl bis (2-hydroxyethyl) ammonium chloride.

6. The method of fracturing as set forth in claim 3 wherein the step of providing comprises providing an aqueous viscoelastic surfactant based fluid further including a particulate proppant suspended therein.

* * * * *